July 19, 1949.

J. F. NORTON 2,476,899

MEANS FOR TESTING THE POTENCY OF MICROORGANISM INHIBITORS

Filed Nov. 17, 1945

INVENTOR
JOHN F. NORTON
BY
ATTORNEY

July 19, 1949.  J. F. NORTON  2,476,899
MEANS FOR TESTING THE POTENCY OF
MICROORGANISM INHIBITORS
Filed Nov. 17, 1945  2 Sheets-Sheet 2
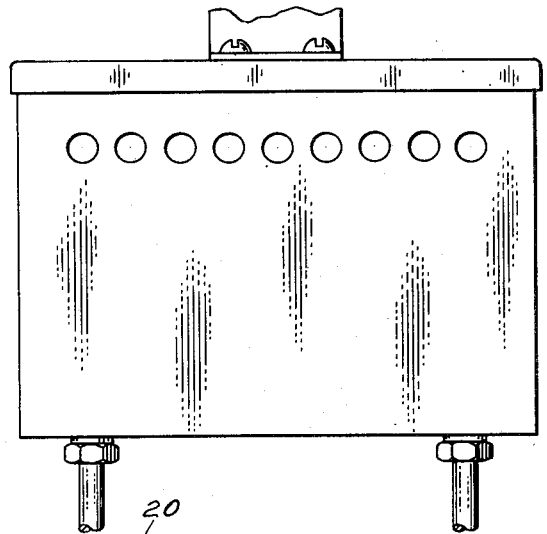
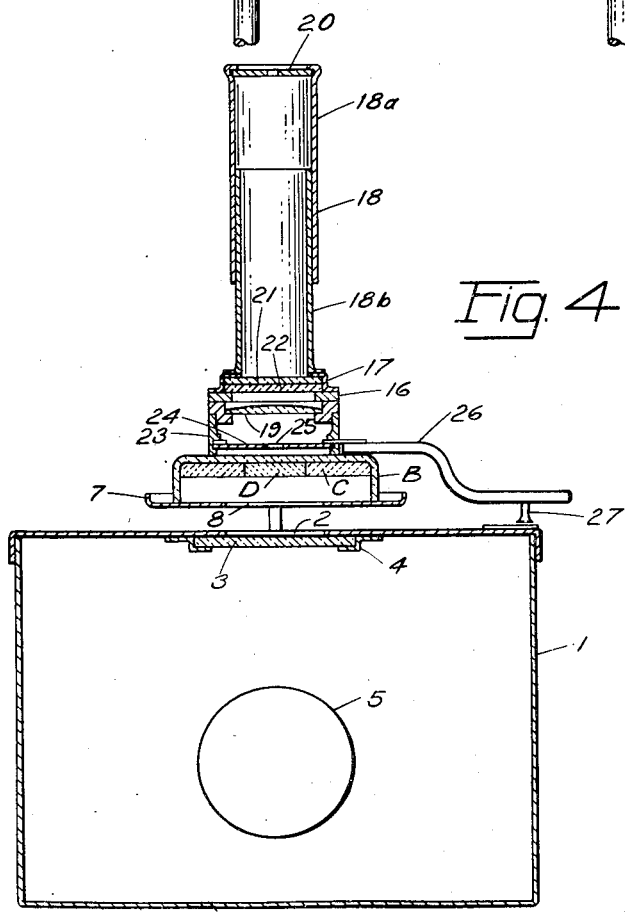
INVENTOR
JOHN F. NORTON
BY
ATTORNEY Patented July 19, 1949

2,476,899

UNITED STATES PATENT OFFICE 2,476,899

MEANS FOR TESTING THE POTENCY OF A MICROORGANISM INHIBITOR

John F. Norton, Kalamazoo, Mich., assignor to The Upjohn Company, Kalamazoo, Mich., a corporation of Michigan Application November 17, 1945, Serial No. 629,239

4 Claims. (Cl. 33—178)

This invention relates to a means for making a germicidal, antiseptic or antibiotic assay, and particularly contemplates a measuring means which will provide an optical analysis of results which may be directly interpreted on a scale.

In a standard method for determining the strength of a sample of germicidal, antiseptic or antibiotic substance, a culture is developed in a suitable medium to a desired concentration and at a selected point in such development a predetermined quantity of the substance being assayed is placed at a selected part of the cultured medium. After a given length of time the substance will have destroyed, or substantially inhibited the growth of, the bacteria, or other culture substance, for a distance radially from the point of application which is a function of the germicidal, antiseptic or antibiotic strength of the said substance. Hence, measurement of the area of the cultured medium in which the culture has been destroyed, or its growth inhibited, in a selected length of time will provide a measurement of the strength of the said substance. Reference is made to the Federal Register of September 8, 1945, for further particulars relating to this method of assay as applied especially to penicillin. The general process has been known for many years as applied to germicidal and antiseptic substances broadly.

In carrying out this method, the step of measuring the area of the culture free portion of the cultured medium has been rather time-consuming and not always sufficiently accurate. Where diameters are measured directly and, as frequently happens, the culture free area is not exactly circular, it requires a substantial expenditure of time to measure with ordinary measuring instruments a sufficient number of diameters to determine an average diameter and to insure reasonable accuracy. Further, even with such expenditure of time in measuring a number of different diameters, the judgment of the operator must still be depended upon to determine whether the proper diameters have been measured, unless the number of diameters actually measured has been very great. Where a grid is superimposed over the culture free, or culture inhibited, area the counting of lines is laborious and of sometimes questionable accuracy. Therefore, it is desirable to provide an instrument which will make this measurement in a rapid and more accurate manner and which may be calibrated for direct reading of either diameter or area, or both, as desired. It is further desirable that such an instrument provide visual analysis of the entire area in question so that the operator may immediately observe any irregularities in said area and easily compensate for them.

Accordingly, the major object of my invention is to provide a means for measuring the area of a culture-free, or culture inhibited, portion of an otherwise cultured medium which can be operated rapidly, which substantially reduces from present methods the judgment required of the individual operator and which means can be readily calibrated to read in whatever units are desired.

A further object of my invention is to provide an instrument which will be simple and economical to construct.

A further object of my invention is to provide an instrument for which the manner of operation can be readily learned.

A further object of my invention is to provide an instrument as aforesaid which will be composed of simple and relatively sturdy parts so that it will withstand normal usage over a long period of time without getting out of adjustment.

Other objects and purposes of my invention will be apparent to those acquainted with this type of equipment upon examination of the accompanying drawings and reading of the following disclosure.

In the drawings:

Figure 3 is a rear view of said instrument.

Figure 4 is a section taken on the line IV—IV of Figure 2 looking in the direction of the arrows.

Figure 1:
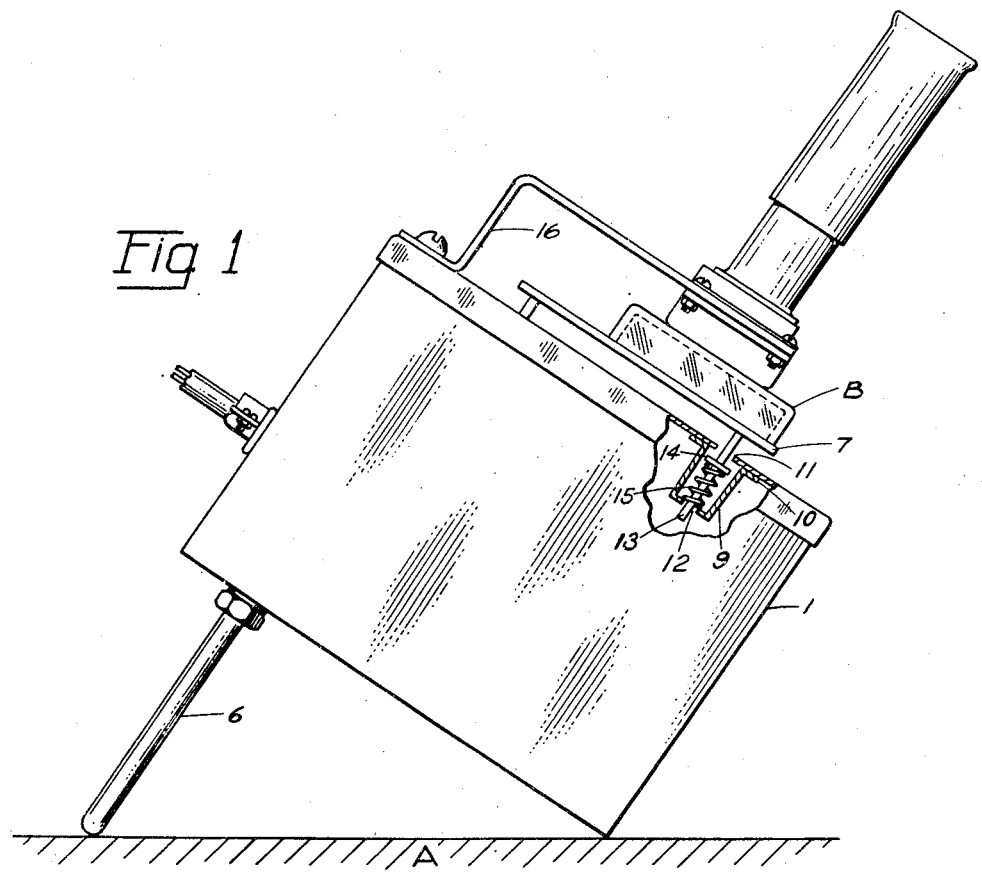
Figure 1 is a side elevation view of an instrument embodying my invention and by which my measuring method may be practiced.
Figure 2:
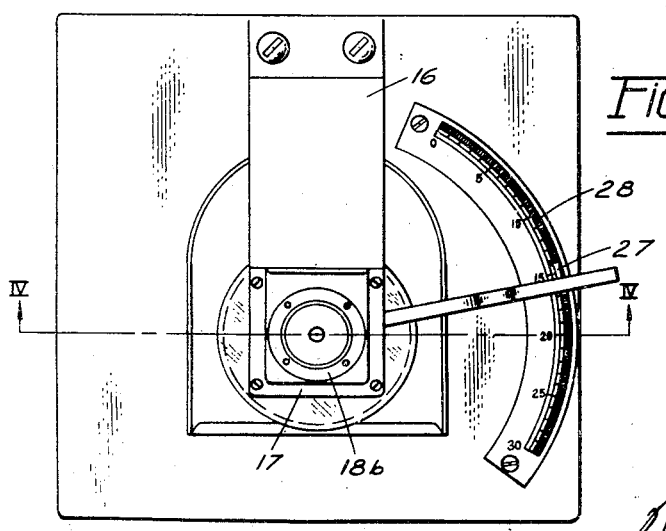
Figure 2 is a top view of said instrument.

In developing an instrument meeting the objectives and purposes above stated, I have utilized the fact that the culture free, or culture inhibited, area of the medium possesses a greater degree of light transmissiveness than the fully cultured area. Thus, by placing the culture medium in a transparent or at least translucent, dish and illuminating same from one side thereof it is necessary only to examine the medium from the side opposite the light source and determine the area of the light transmitting portion. This latter step I have accomplished by arranging a suitable optical system together with an iris. The operator looks through the elements of the optical system and manually adjusts the iris until its circumference is as nearly as possible coincident with the perimeter of the area within the cultured medium having the greater light transmitting capacity. A pointer mechanically associated with said iris indicates its degree of opening in terms either of diameter or of area, or both, as desired for any given position.

Looking now at the figures in more detail there is provided a box-shaped base member 1 which is light-tight throughout excepting from an opening 2 in its upper side. This opening is covered by a frosted glass 3 suitably held adjacent said opening by any convenient means, such as the brackets 4. Within the box there is provided a source of illumination 5 such as an incandescent electric light. This light source will be provided with suitable energizing means and a switch, neither of which are here shown. The base may be supported by suitable frame members 6 which are here shown as rods for holding the instrument at a convenient working angle with respect to a table A, but which may be of any convenient form.

A platform 7 for holding the medium containing means, such as a Petri dish B, is located directly above the opening 2 and may be supported in any convenient manner. An opening 8 is provided in said platform to permit the uninterrupted passage of light therethrough unless the platform itself is made of transparent material. Convenient means for supporting said platform may be had by providing under preferably three points of said platform a well 9 suitably fastened in any convenient manner at 10 to the upper sheet of the box-shaped base 1. An opening 11 is provided through said upper sheet and vertically aligned therewith an opening 12 is provided through the bottom part of the said well. A supporting pin 13 depends from the underside of the platform 7 through the openings 11 and 12. A collar 14 is mounted on said pin in any convenient manner, as by pressing thereon, which collar backs a spring 15 resting at its other end against the bottom of the well 9. Thus the platform is resiliently mounted so that the Petri dish B is easily inserted and then held firmly against the hereinafter described members of the analyzing part of the device. It thus provides means of holding the cultured medium C as closely as possible to, but a uniform distance from, the hereinafter mentioned iris.

The analyzing portion of this device is mounted directly above the opening 8 in the platform and is supported by a suitable bracket 16 which is mounted on the base 1 and supports the barrel base 17. This base supports the barrel 18, which conveniently consists of telescoping parts 18a and 18b. Held below the base 17 and the supporting frame 16 is convex lens 19 mounted in any convenient manner. At the upper end of the barrel part 18a is an eye-piece 20 which comprises either an opaque disk with a small opening therein, or it may include another lens if desired for better magnification. However, for ordinary purposes the one lens 19 is sufficient, so that the eye-piece 20 may usually be formed as shown as an opaque member with a small opening in its center. The lens 19 and eye-piece 20 are respectively spaced from the platform a distance such that the surface of the cultured medium C held in the Petri dish B on the platform 7 will be in proper focus to the operator's eye when positioned above but close to said eye-piece. While no adjustable focusing means other than the telescoping barrel 17 are here shown, such may be readily provided in any standard manner if desired. A plurality of suitable light filters 21 and 22 are placed in the line of vision, such as between the lens 19 and the eye-piece 20 as shown in Figure 4 to reduce the intensity of light reaching the operator's eye. This is not essential to the operation of my measuring device but is desirable since it substantially reduces eye fatigue in the operator.

At the lower end of the analyzing portion of my device and below the lens 19, there is located a standard iris 23 having the usual overlapping plates 24 and a central substantially circular opening 25 of variable size. The iris is operated in any convenient and standard manner by a handle 26 and supports near its end an indicator 27. This indicator travels over a scale 28 which is arranged and calibrated to indicate either the diameter, or the area, or both as desired, of the culture inhibited part of the cultured medium in any given adjusted position of said iris.

The operation of the device is simple. With the light source 5 illuminated, a specimen such as a transparent or translucent dish B containing the cultured medium C to be examined is placed on the platform 7 and centered with respect to the opening 8 therein. The operator looks through the eye-piece 20 and adjusts the arm 26 in such a manner that the iris opening substantially coincides with the lighter area D of the cultured medium. While some judgment will be required to determine this coincidence it will be much less than is now required for making direct measurements and will, in fact, be found relatively easy. When the iris is thus adjusted the diameter and/or area of the culture free portion of the culture medium may then be directly read from the scale 28.

It should be noted that while the scale may be made to read in terms of the iris opening and that standards may be set up accordingly, it will be much preferred to calibrate said scale to read directly in terms of the diameter and/or area of the culture free, or culture inhibited, portion of the cultured medium in order that the results of assay by this device may be compared with results of assay by conventional methods.

While, as above noted, more lenses than the single one shown may be used, the use of only one lens will be advantageous over the use of two lenses in that it will provide at the eye-piece without special focusing a real image of both the surface being studied and the iris opening, even though said images will be of slightly different degrees of magnification. Thus, even though the iris and said surface are required to be a substantial distance apart, both elements will be sharp and clear as viewed from the eye-piece.

Several variations may be made from the specific structure herein dislcosed which will fall within the scope of my invention and accordingly the hereinafter appended claims should be read to include such variations excepting as they are excluded by the express terms of said claims.

I claim:

1. In apparatus for measuring the diameter of an area of one light transmitting capacity which is surrounded by a medium of a different light transmitting capacity, both mounted on a transparent member, the combination comprising: a supporting frame; a source of illumination of substantially uniform intensity attached to said frame; an eyepiece and an iris diaphragm mounted on said frame in axial alignment with said source of illumination, said iris diaphragm positioned between said eyepiece and said source of illumination; means for supporting said transparent member between said iris diaphragm and said source of illumination spaced a predetermined distance from said iris diaphragm and with said area concentric with said iris diaphragm, whereby light from said source of illumination passes through both said area and said medium to said eyepiece; means operatively connected to said iris diaphragm for adjusting the diameter of its opening and indicating on a scale a predetermined function of the diameter of said opening when the iris diaphragm is adjusted to pass to the eyepiece only light emanating from said area.

2. In apparatus adapted for receiving a specimen having an area of one light transmitting capacity which is surrounded by a medium of a different light transmitting capacity and for measuring the diameter of said area, the combination comprising: a frame; a source of illumination of substantially uniform intensity attached to said frame; an iris diaphragm mounted on said frame; means for supporting said specimen between said iris diaphragm and said source of illumination spaced a predetermined distance from said iris diaphragm and with said area co-axial with the opening in said iris diaphragm; an optical system including an eyepiece spaced from said iris diaphragm in a direction opposite from said source of illumination and mounted on said frame in alignment with said iris diaphragm, area and source of illumination for receiving light from said source passing through both said area and said medium; means operatively connected to said iris diaphragm for adjusting the diameter of its opening and indicating on a scale a predetermined function of the diameter of said opening when the iris diaphragm is adjusted to pass to the eyepiece only light emanating from said area.

3. An apparatus for measuring the potency of a given quantity of a micro-organism inhibitor which micro-organism inhibitor is placed upon an inoculated culture plate for creating a zone of inhibition of micro-organic growth of one light transmitting capacity surrounded by an uninhibited culture zone of a different light transmitting capacity, the combination comprising: a supporting frame; a source of illumination and an eyepiece supported by said frame; an iris diaphragm mounted on said frame between said source of illumination and said eyepiece; means for positioning said culture plate between said source of illumination and said iris diaphragm spaced a predetermined distance from said iris diaphragm and with said zone of inhibition of micro-organic growth aligned with said source of illumination, said iris diaphragm and said eyepiece; said source of illumination projecting light rays of substantially equal intensity through both said zone of inhibition of micro-organic growth and said surrounding uninhibited culture zone to said eyepiece; a scale and means operatively connected to said iris diaphragm for adjusting the diameter of its opening and indicating on said scale a predetermined function of the diameter of said opening when the iris diaphragm is adjusted to pass to the eyepiece only light emanating from said zone of inhibition of micro-organic growth.

4. An apparatus for measuring the potency of a given quantity of growth inhibitor which growth inhibitor is placed upon an inoculated culture plate for creating an area of inhibition of growth of one light transmitting capacity surrounded by a zone of uninhibited growth of a different light transmitting capacity, the combination comprising: a housing having an opening in one end thereof; a source of illumination of substantially uniform intensity mounted within said housing co-axially with said opening; a frame mounted to said housing; an optical system mounted on said frame co-axially with said opening; an iris diaphragm mounted on said frame between said optical system and said opening and co-axially with said opening and said optical system; means connected with said housing for positioning said culture plate spaced a predetermined distance from said iris diaphragm and with said area of inhibition of growth positioned co-axially with said opening, iris diaphragm and optical system; a scale and an indicator hand operatively connected to said iris diaphragm for adjusting the diameter of the opening in said iris diaphragm and indicating on said scale a predetermined function of the diameter of said iris diaphragm opening when the iris diaphragm is adjusted to pass to the eyepiece only light emanating from said area of inhibited growth.

JOHN F. NORTON.

REFERENCES CITED

The following references are of record in the file of this patent:

UNITED STATES PATENTS

| Number | Name | Date |
| --- | --- | --- |
| 1,353,151 | Deming | Sept. 21, 1920 |

FOREIGN PATENTS

| Number | Country | Date |
| --- | --- | --- |
| 721 | Great Britain | Jan. 16, 1915 |
| 171,054 | Switzerland | Oct. 16, 1934 |